Feb. 9, 1971    E. L. CRANDAL ET AL    3,562,085
FILAMENT TAPE WINDING
Filed March 8, 1967
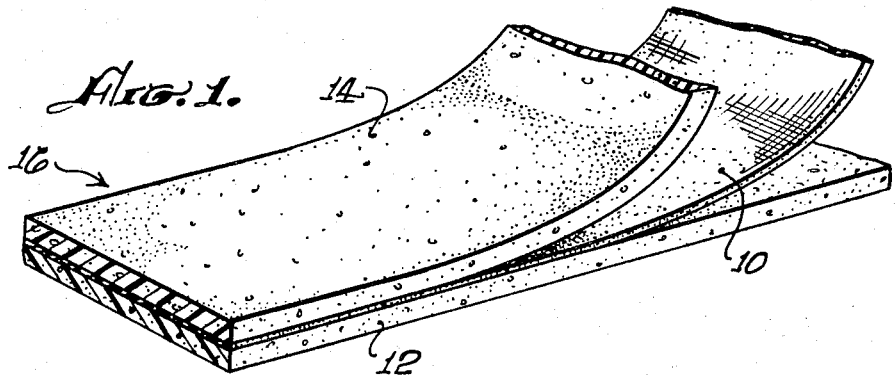
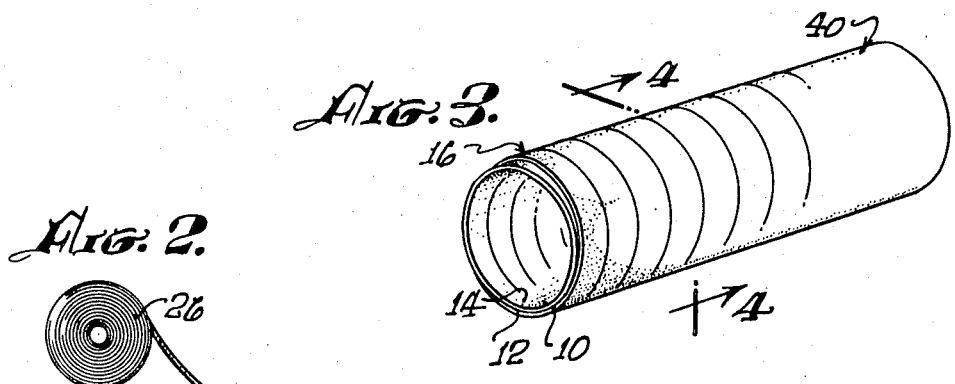
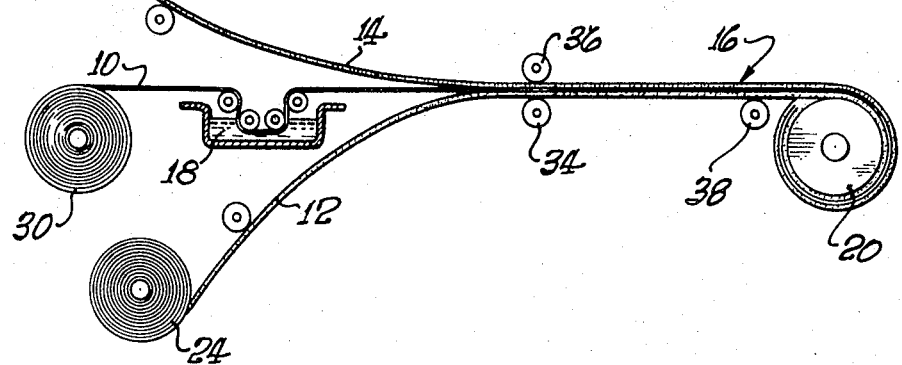
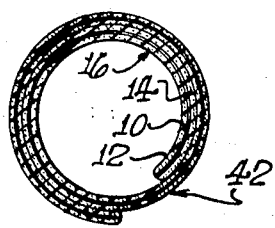
INVENTORS.
EDWIN L. CRANDAL,
CHARLES E. KAEMPEN,
By THEIR ATTORNEYS.
Spensley & Horn.

United States Patent Office 3,562,085
Patented Feb. 9, 1971

3,562,085
FILAMENT TAPE WINDING
Edwin L. Crandal, 205 Via Jucar, Newport Beach, Calif. 92660, and Charles E. Kaempen, 3202 Larkstone Drive, Tustin, Calif. 92680
Filed Mar. 8, 1967, Ser. No. 621,614
Int. Cl. B32b 5/28, 5/32, 31/12
U.S. Cl. 161—93
4 Claims

ABSTRACT OF THE DISCLOSURE

A method for the fabrication of laminated plastic structures using tape winding techniques. A composite tape material is utilized in the present winding process comprising an intermediate layer of resin impregnated reinforcing material imposed between two layers of a substrate material. The method of the present invention comprises the steps of imposing a continuous strip of resin impregnated reinforcing material between two continuous strips of substrate material thereby forming a composite tape; winding the composite tape around a mandrel until the surface of the mandrel is covered, then curing the composite tape. In the preferred embodiment of the invention, the substrate material is polystyrene foam and reinforcing material is fiberglass impregnated with a curable polyurethane elastomer.

BACKGROUND OF THE INVENTION

This invention relates to a composite tape material and to a method of fabricating laminated plastic structures with same.

Laminated plastic structures such as tubing, ducting, sheets or other shapes can be fabricated by imposing several layers of a resin impregnated reinforcing material on top of one another, applying sufficient pressure to obtain good contact between them and curing the resinous component of the composite material until it has hardened and a laminated plastic structure is obtained. Another technique for producing such laminated articles is to wind a resin impregnated tape around a rotating form or mandrel until several such layers have been built up to a required thickness. The structure is then cured until hard, and the mandrel is removed thereby leaving a hollow laminated plastic article. When resin impregnated glass strands are used as the reinforcing material, a filament winding process may be used to manufacture a hollow laminated plastic article. Filamentary materials other than glass can be used in conjunction with a filament winding process; most of these materials are supplied in the form of tapes that can be unspooled and impregnated during the winding process. In order to insulate or to fabricate many articles manufactured by filament winding, strips of insulating material are generally wrapped around the article after it has been wound and cured. Also, if the filament wound article requires, for structural purposes, relatively thick walls but not high tensile strength, a bulk material may be interspersed with the glass filament wound layers. Constructing filament wound articles of composite materials by prior art winding methods and using prior art tapes is a slow, uneconomical and complex process. The tape material of the present invention solves the prior art problem by providing a composite tape that can be directly wound upon a form or mandrel.

SUMMARY OF THE INVENTION

In one of its broad aspects, the composite tape, which is the subject of the present invention, comprises an intermediate layer of resin impregnated reinforcing material imposed between two layers of a substrate material.

The method of the present invention broadly comprises the steps of imposing a continuous strip of resin impregnated reinforcing material intermediate two continuous strips of substrate material thereby forming a composite tape; winding the composite tape around a mandrel until the surface of the mandrel is covered, then curing the composite tape.

Accordingly, it is an object of the present invention to provide a composite material for the fabrication of laminated plastic articles.

It is another object of the present invention to provide a composite tape material for use in a winding process to produce laminated plastic articles.

Yet another object of the present invention is to provide a method of fabricating laminated composite plastic articles comprising alternate layers of fiberglass and of a foam material.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

In the drawing:
FIG. 1 is a perspective of the composite tape material used in the method of the present invention;
FIG. 2 is a schematic of one method of fabricating a laminated article using a composite tape material;
FIG. 3 is a perspective, partially sectioned, of an article produced by the method of the present invention; and
FIG. 4 is an end view of an article produced by the method of the present invention.

DESCRIPTION OF THE PREFERRED

Although not limited thereto, the method of the present invention has been found to be particularly suited to the construction of cylindrical containers by a filament winding process and will accordingly be described in connection with such use.

Referring now to FIG. 1, a composite tape 16 is comprised of a resin impregnated reinforcing layer 10 laminated between a first substrate layer 12 and a second substrate layer 14. Reinforcing layer 10 can be a fabric made of fiberglass or of an organic polymeric material such as Dacron or nylon. The fabric can be woven in any convenient pattern that fulfills the strength requirements of the fabric. In the presently preferred embodiment of the invention, a fiberglass fabric is utilized which is woven in a so-called 181 style weave.

The reinforcing fabric is impregnated with a curable polymeric elastomer. This serves, when cured, to encapsulate individual glass fibers in the fiberglass fabric thus protecting them from abrasive forces and unidirectionally aligning them so that the fabric has the ability to resist high tensile stresses. Another important function of the impregnating resin is to adhere the reinforcing fabric between two substrate layers thus forming a laminated composite tape 16. The elastomeric polymer preferably used in the present invention is a polyurethane elastomer. Such a polymer comprises a mixture of a polyhydroxy compound such as a glycol and an isocyanate pre-polymer material. A crosslinking reaction takes place between the isocyanate pre-polymer and the hydroxyl groups of the polyhydroxy compound thus forming a tough polyurethane elastomer. Materials that have been found to be very effective as the resinous component of a composite tape are sold under the trademark Polylite and are manufactured by Reichold Chemicals, Inc., Los Angeles, Calif. These materials are two component systems comprising a polyhydroxy compound and an isocyanate prepolymer comprising primarily Toluenediisocyanate. Some of the polyhydroxy components that can be used are Polylite 98–365, Polylite 34–970 and Polylite 98–360. Isocyanate pre-polymers that can be used are designated Polylite 98–331 and Polylite 34–625. One important characteristic of this polyurethane resin is that it contains no solvents or diluents. Typical formulations for impregnating glass cloth which contain these components are as follows:

EXAMPLE I

| | Parts by weight |
|---|---|
| Polylite 98–365 (polyhydroxy compound) | 100 |
| Polylite 98–331 (isocyanate pre-polymer) | 50 |

EXAMPLE II

| | |
|---|---|
| Polylite 34–970 (polyhydroxy compound) | 100 |
| Polylite 34–625 (isocyanate pre-polymer) | 16 |

EXAMPLE III

| | |
|---|---|
| Polylite 98–360 (polyhydroxy compound) | 100 |
| Polylite 98–331 (isocyanate pre-polymer) | 20 |

Referring again to FIG. 1, substrate layers 12 and 14 comprise layers of a plastic foam material which are imposed upon the top and bottom surface of reinforcing layer 10. In the preferred embodiment of the present invention, substrate layers 12 and 14 comprise foamed polystyrene resin. This material can be used as an open cell or as a closed cell material. The substrate layers provide rigidity and bulk for a laminated structure and, in addition, provide thermal insulation where this is required. Substrate layers 12 and 14 are of the same width as the layer of reinforcing material 10 which is imposed between them. The thickness of the substrate layers can vary over a wide range which is determined by design requirements; typically, substrate layers are between 0.1 and 0.5 inch thick. If a structure is to be filament wound, the substrate layers must be thin enough to bend around the diameter of a mandrel or form without cracking. A composite tape material is thus provided which comprises a layer of resin impregnated reinforcing fabric sandwiched between two foam substrate layers. It is, of course, within the scope of the invention to provide a composite tape having several alternating layers of foam and of reinforcing material, the only limitation being the overall thickness of the tape which must be thin enough to allow it to be either laminated into sheets or to bend around a mandrel in a filament winding process.

With reference to FIG. 2 there is shown one method by which the composite tape can be produced and how it can be utilized in a filament winding process.

Layers of substrate material 12 and 14 are fed continuously from spools 24 and 26 respectively, which are located in the vertical plane above one another. Reinforcing fabric 10 is continuously unwound from spool 30 at a position intermediate substrate layers 12 and 14. After leaving the spool 30, the reinforcing fabric 10 is passed through resin bath 18 which contains a polyurethane resin as previously described herein. After passing through resin bath 18, reinforcing fabric 10 is positioned between substrate layers 12 and 14 and then is fed through rollers 34 and 36. Rollers 34 and 36 are so positioned that they apply pressure upon superimposed layers 12 and 14 with layer 10 therebetween; the amount of pressure applied is sufficient to produce an uncured laminated tape material. The pressure so applied is generally between about 3 to 15 p.s.i.

The laminated composite tape is next passed over guide roller 38 of a conventional filament winding apparatus no part of which is described or claimed as part of this invention. One end of the composite tape is attached to a mandrel 20 of a conventional filament winding machine not described herein. Mandrel 20 rotates at a constant and predetermined speed and composite tape 16 is wound around the mandrel until the surface of the mandrel is covered by bands of tape. The winding pattern, i.e., the angle which the tape makes with respect to the longitudinal axis of the mandrel and the distance between each circumferential loop of tape, is determined by the structural requirements of the article being manufactured and can be widely varied. As the mandrel rotates the tape is circumferentially wound around it and is wound from one end of the mandrel to the other. If several layers of composite tape are required, the tape is wound back and forth across the mandrel until sufficient layers have been formed.

The final step in the invented process is to cure the tape o the mandrel. Cure can take place by allowing the tape to stand at about 72° F. for approximately 24 hours. The cure can be accelerated by applying a temperature of up to 250° F. for about 4 hours by means of an oven or a heat lamp. When cure takes place reinforcing fabric 10 becomes integrally bonded to substrate layers 12 and 14 to form a sandwich structure.

It is also within the scope of the invention to provide reinforcing material 10 as a partially cured pre-impregnated fabric. Thus, the fabric is pre-impregnated with a liquid polyurethane resin and partially cured. It is then stored at a sufficiently cold temperature so that the chemical crosslinking reaction (curing) is stopped. When an article is to be manufactured, the pre-impregnated fabric is removed from cold storage and put onto spool 30. Thereafter, the pre-impregnated fabric is laminated between substrate layers 12 and 14 without going through the resin bath. The winding operation then continues as previously described. After cure, the mandrel can be removed, thereby leaving a hollow filament wound article. Alternatively, the mandrel can be constructed so as to become an integral part of the completed structure.

With reference to FIGS. 3 and 4 there is shown an article 40 manufactured by the described process. The articles comprise concentric shells of laminations 42 having alternate layers of foam substrate material and polyurethane impregnated reinforcing fabric which preferentially is of fiberglass.

The invented composite tape and method of fabricating articles with it is advantageous because articles such as storage tanks can be rapidly and inexpensively manufactured with the foam substrate material acting as thermal insulation. Another advantage of the process is that articles having relatively thick and rigid walls can be manufactured rapidly since the applied foam layers add bulk and rigidity to the structure. Thus, these articles are ideally suited for the storage of liquids that require insulated containers.

What is claimed is:
1. A composite tape material comprising:
    a first substrate layer of polystyrene foam;
    a second substrate layer of polystyrene foam;
    a layer of curable polyurethane elastomeric foam interposed between said first substrate layer and said second substrate layer; and, a reinforcing fabric disposed within, and completely impregnated by, said layer of curable polyurethane elastomeric foam, whereby said first and second substrate layer, said layer of curable polyurethane elastomeric foam, and said reinforcing fabric form a laminate.

2. The composite tape material as defined in claim 1 wherein said curable polyurethane elastomeric foam comprises a polyhydroxy compound in the range of 80 to 100 parts by weight and a polyisocyanate pre-polymer in the range of 20 to 75 parts by weight.

3. The composite tape material as defined in claim 1 wherein said reinforcing fabric is fiberglass.

4. The composite tape material as defined in claim 1 wherein said reinforcing fabric is an organic polymeric material.

References Cited
UNITED STATES PATENTS

| | | | |
|---|---|---|---|
| 2,999,041 | 9/1961 | Lappala | 161—161 |
| 3,144,492 | 8/1964 | Lightner et al. | 161—160 |
| 3,172,072 | 3/1965 | Willy | 161—159 |

WILLIAM J. VAN BALEN, Primary Examiner

U.S. Cl. X.R.

156—173, 313; 161—160, 165, 190